G. A. KRAMER.
REFRIGERATION APPARATUS.
APPLICATION FILED FEB. 12, 1915.
1,280,765.
Patented Oct. 8, 1918.
2 SHEETS—SHEET 1.
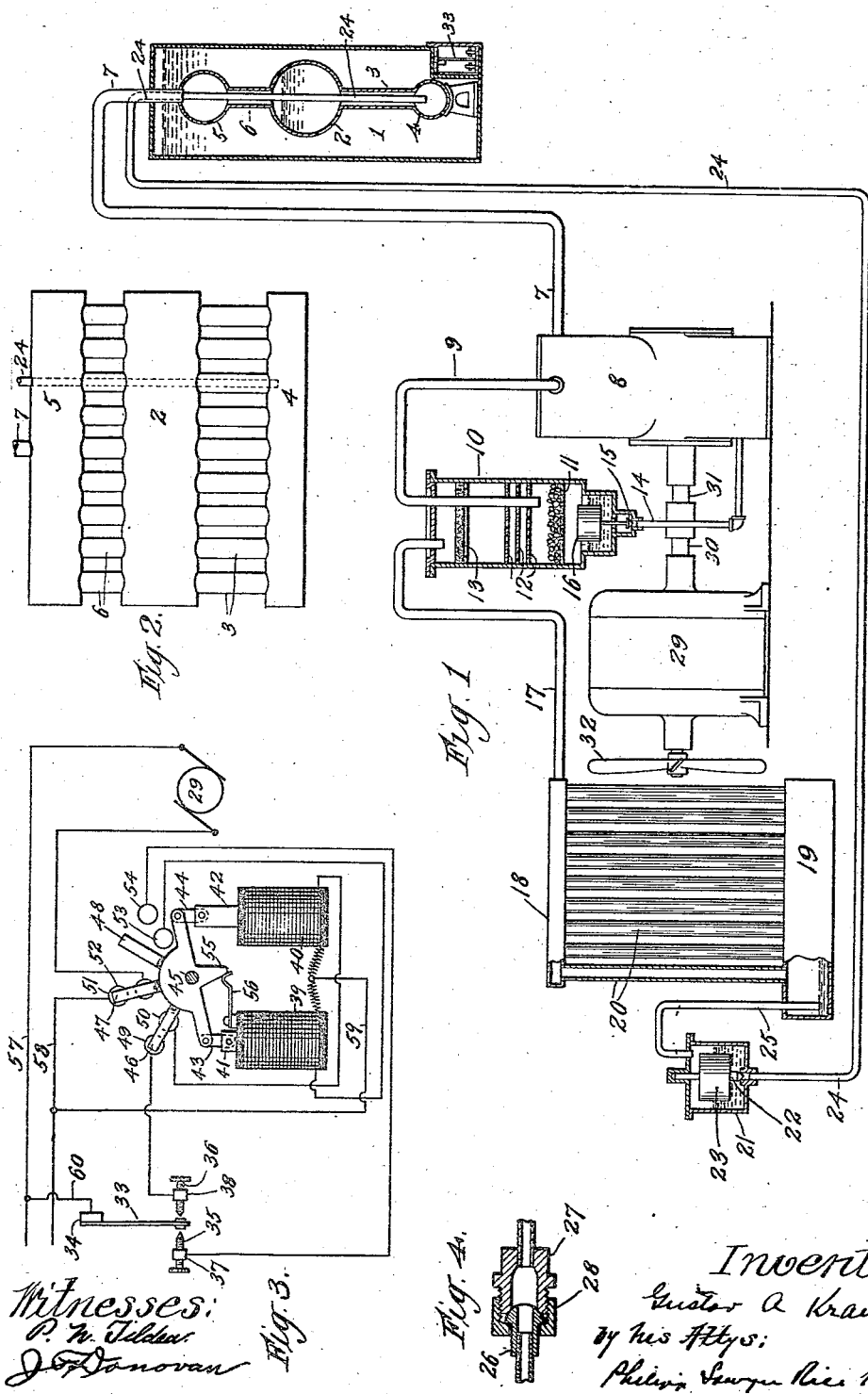

lever device 45' fulcrumed at 45, and having switch arms 46, 47 and 48. The arm 46 is arranged to close a circuit through contact points 49 and 50; the arm 47 is arranged to close a circuit through contact points 51 and 52, and the arm 48 to close a circuit through contact points 53 and 54. The arrangement of the arms is such that when the arm 46 is on contact points 49 and 50, the arm 47 is on the main contact points 51 and 52, while the arm 48 is then out of contact with the points 53 and 54. When the arm 48 is moved into contact with points 53 and 54 it closes the circuit through them, and the circuits through the other pairs of contact points are opened.

The rock-lever device has an arm 55, which may ride to one side or the other of a nose formed on a spring 56, the function of this spring being to cause the rocking lever 45' to complete its movement, and to keep the lever in either of its extreme positions.

The main electric lines are indicated at 57 and 58. One of these lines, for example, the line 57, runs directly to the electric motor 29, while the other line, as, for example, the line 58, is led to the motor through the two contact points 51 and 52, the circuit being closed only when the arm 47 is in contact with said points.

The solenoid coils 39 and 40 are each included in a local circuit leading from its respective contact post 37, 38. The said coils have a common return wire 59 leading from the main line wire 58. Each local circuit includes the pair of contact points 49 and 50, 53 and 54. The contact post 34 of the thermostatic bar is connected to the main line wire 57 as by the conductor 60.

The solenoids and the rocking lever device with the corresponding arms and coacting contact points constitute an automatic switch, serving to start and stop the motor and also to control the controlling circuits to the respective solenoids.

While the thermostatic device may be placed at any particular point the temperature of which is to be controlled, it is an important feature of the present invention that this thermostatic device is removably located within the brine tank 1 for the following reasons: The brine tank with its refrigeration coil takes the place of a block of ice in the ordinary refrigerator, and by locating the thermostatic device within the brine tank the apparatus is controlled to maintain a fairly uniform temperature of the brine. This avoids the irregular operation of the refrigerating apparatus, which might otherwise be brought about by opening the refrigerator doors, which might occur if the thermostat were located directly in the refrigerator compartment and accessible to the atmosphere.

As shown in Figs. 5 and 6, the mechanism so far described is entirely inclosed, except for the electrical connections to the motor, in a refrigerator body 70, which, as usual, is in the form of a double-walled casing. The brine tank 1, in which is located the refrigeration coil, is suitably supported in the cooling chamber 71 of the refrigerator on angle irons 72 secured to the refrigerator walls. The cooling chamber 71 is divided by a partition 73, which extends from the front to the back of the refrigerator and secured to the front and back walls thereof, passages being left above and below this partition for the circulation of air through the cooling chamber. Trays 74, suitable in number, may be provided supported on brackets 75 of this partition and on one of the side walls of the refrigerator.

To effect one of the objects of the invention, the compressor, motor, condenser, oil separator and fan, are supported so that they may be removed as a unit from the refrigerator casing for the purpose of ready inspection and necessary repairs. The manner in which these parts are thus supported may be somewhat varied, but in the particular construction illustrated, below the bottom of the refrigerator, a compartment 56 is provided, at the bottom of which, between the refrigerator legs 77, is hung a support or base 78, arranged to slide on slides 79, shown in the form of angle irons supported from brackets 80 secured to the refrigerator legs. The compressor 8, oil separator 10, motor 29, fan 32 and condenser 20 are supported on this base 78, and may slide as a unit thereon from the position shown in Fig. 6 to that shown in Fig. 7. To effect this, it is simply necessary to uncouple the pipe 7 through the coupling 28, and the pipe 24 through the coupling 27, as shown in Figs. 6 and 7, when the whole mechanism may be removed to the position shown in the latter figure, when all the parts thereof are in position for ready inspection.

The operation of the device may be briefly described as follows: The refrigerant liquid in the refrigeration coil will be vaporized by the heat which it absorbs from the brine. The vapor passing through the pipes 6 enters the vapor receptacle 5, from whence it is pumped through the pipe 7 by the vacuum pump and compressor 8. The compressed vapor is forced through the pipe 9 into the lubricant separator 10. The purpose of this separator is to remove any lubricant, such, for example, as glycerin, which might escape past the pistons of the compressor. The vapor freed from the lubricant passes from the separator on pipe 17 to the condensing or cooling coil. It is subjected to the air cooling effect of the fan 32, and condenses in liquid form in the liquid receptacle 19. From here it is discharged by the pipe 25 to

UNITED STATES PATENT OFFICE.

GUSTAV A. KRAMER, OF NEW YORK, N. Y., ASSIGNOR, BY MESNE ASSIGNMENTS, TO THE FRIGIDOR CORPORATION, A CORPORATION OF VIRGINIA.

REFRIGERATION APPARATUS.

1,280,765.  Specification of Letters Patent.  Patented Oct. 8, 1918.

Application filed February 12, 1915. Serial No. 7,660.

*To all whom it may concern:*

Be it known that I, GUSTAV A. KRAMER, a subject of the King of Hungary, now residing at New York city, county of New York, and State of New York, have invented certain new and useful Improvements in Refrigeration Apparatus, fully described and represented in the following specification and the accompanying drawings, forming a part of the same.

This invention relates to an improvement in refrigeration systems and particularly to a type of evaporation system particularly suitable for small plants, such for example as household refrigerators.

The object of the invention is to provide a system which will be reasonably efficient in small units, automatic and reliable in operation, and capable of ready inspection and repair. It is a further object of the invention to provide a construction for use with small refrigerators, in which the compressor, the motor and the condenser are so mounted and positioned in the refrigerator that they may be removed therefrom for purposes of inspection and repair with the least possible difficulty.

With these general objects in view, and some others which will be apparent to those skilled in the art, the invention consists in the features, details of construction and combination of parts which will first be described in connection with the illustration of the preferred embodiment and then more particularly pointed out.

In the drawings—

Figure 1 is a diagrammatic view of a small refrigeration system embodying the invention, the refrigerator being omitted;

Fig. 2 is a side elevation of the refrigeration coil removed from its brine tank;

Fig. 3 is a diagrammatic view of a thermostatic control device including an automatic switch embodying an important feature of the system;

Fig. 4 is a detail sectional elevation of a special type of coupling employed in the preferred embodiment of the invention;

Fig. 5 is a front elevation, partly in section, of a small refrigerator, showing the parts in the position of use;

Fig. 6 is an end elevation, partly in section, of the construction shown in Fig. 5, and Fig. 7 is a view similar to Fig. 6, partly broken away and partly in section, showing the compressor, motor and condenser removed from the refrigerator casing.

A refrigeration apparatus embodying the present invention depends for its refrigerative effect upon the evaporation of a volatile refrigerant at the point where the refrigeration is desired.

Referring to the drawings, 1 is a brine tank arranged to be located in the chamber which is to be cooled. In the present example, the brine tank is a metal body, preferably entirely closed or sealed and arranged to be placed in the ice compartment of an ordinary refrigerator.

Within the brine tank is located a holder for the refrigerant, this holder constituting in effect what may be termed a refrigeration coil. The particular construction of this refrigeration coil may be somewhat varied, but in constructions embodying the invention in its best form, there will be provided means whereby an excess of refrigerant over and above that necessary for the operation of the system may be supplied to the coil. The particular means whereby this is effected may, of course, be considerably varied, but, as shown, the holder, at a point intermediate its top and bottom, is provided with an enlarged portion forming a chamber 2, which is relatively large with respect to the rest of the coil in order to contain a relatively considerable body of refrigerant liquid, thus providing for an excess of refrigerant liquid to compensate for any small leakage which may occur during a continued use of the apparatus. This chamber is above and connected by vertical pipes 3, in the particular construction illustrated, with a receiver 4 shown in the form of a manifold. Above the chamber 2 is a vapor receptacle 5, connected by suitable pipes 6 with the chamber, this receptacle acting as a dome or hood to prevent spray caused by the bubbling of the refrigerant from being carried into the compressor hereinafter referred to.

A suitable means is provided for removing the vapor of the refrigerant liquid from that part of the refrigeration coil above the liquid level. In the present example, the dome or hood 5 is connected by a pipe 7 with the inlet of a suitable vacuum pump and compressor, such as the two-cylinder trunk casing compressor indicated t 8.

From the outlet of the compressor, a pipe 9 leads to a lubricant separator 10, the pipe 9 having its end bent downward and extended toward the bottom of the said separator. The separator is provided with suitable means for separating lubricant from the vaporized refrigerant. In the example illustrated, the separator contains a perforated partition 11, on which may be placed some granulated or similar material which will tend to entangle the lubricant and hold it back from the refrigerant. This partition and the material supported by it is below the mouth of the pipe 9. A plurality of baffle plates 12 is arranged in the separator above the end of said pipe 9, the respective baffle-plates being provided with holes, those on one plate being in staggered relation to those of any adjacent plate, so that the refrigerant is compelled to take a tortuous path in going past the baffle-plates. At the upper end of the separator is located a filter device 13, consisting of a support on which is placed a sheet of suitable filter material, such as felt or the like.

The bottom of the separator is arranged to form a well in which the separated lubricant may be collected. From this well the lubricant is automatically returned to the lubricant receptacle of the compressor through a return pipe 14, which, in the particular instance shown, is controlled by an upwardly opening float valve 15, provided with a float 16, located in the well.

The refrigerant is led away from that part of the separator above the filter 13 by a pipe 17, and is conducted to the upper part of a condensing or cooling coil, which in the best embodiment of the invention comprises a top manifold 18, a liquid receptacle 19 at the bottom, and a plurality of pipes 20, connecting the manifold and liquid receptacle.

The condensed liquid is transferred from the liquid receptacle 19 to the refrigeration coil by means arranged to act automatically. The means for accomplishing this constitutes an important feature of the present invention. These means may be somewhat varied in the best constructions, however, and as shown such means comprise a float valve chamber 21, containing an upwardly-opening valve 22, and a float 23. The chamber 21 has its valve-controlled opening connected to the refrigeration coil, as, for example, by means of a pipe 24, which leads to the receiver 4 of said coil. While in the preferred construction the refrigerant is returned to the refrigeration coil through receiver 4, it will be understood that such refrigerant may be returned to the coil at any other desired point.

The float valve chamber 21 has its upper portion connected to the liquid receptacle 19 by a pipe 25, in the present example arranged like a siphon, this pipe being provided with a joint of special construction which may be opened to permit ready disconnection of the float valve chamber.

As shown in Fig. 1, the lower end of the siphon pipe 25 extends into the liquid receptacle 19 of the condensing coil, and acts to siphon over the condensed refrigerant to the valve chamber 21. As shown, the lower end of the siphon pipe 25 extends into the receptacle 19, but is spaced from the bottom thereof a short distance so that it does not siphon out all the contents of the chamber. With this construction, impurities of heavier specific gravity than the liquid refrigerant are held in the chamber 19 below the end of the siphon tube and are not siphoned over into the valve in returning to the system.

The joint, shown in detail in Fig. 4, is formed like the ordinary union, with the exception, however, that the head of the pipe-engaging member 26 is made of hard metal and is arranged to be brought in forcible contact with the inner edge of the pipe-engaging member 27, made of a relatively softer metal, by the collar 28, by which it results that when the collar 28 is screwed up, the two members 26 and 27 are forced together with sufficient pressure to compress the sharp inner edge of the soft metal member 27 into a flat seat, and thus produce a tight joint equal to or better than the best ground joint. By forming the hard metal member 26 with a semispherical head, a perfect seat is produced, even if the parts are a little out of alinement or imperfectly machined.

For the purpose of operating the plant an electric motor 29 is employed, its shaft 30 being coupled to the crank-shaft 31 of the compressor. The opposite end of the motor-shaft is preferably provided with a fan 32, which is so located as to cause a current of air for assisting in the cooling of the condenser.

The electric motor is stopped and started automatically, according to the requirements of the refrigeration. In order to accomplish this result, a thermostatic control of the motor is provided, the thermostat being placed in close proximity to the refrigeration coil, and preferably within the brine tank. The particular mechanism by which the thermostatic control is obtained constitutes an important feature of the present invention.

In the best embodiment of the invention, a thermostat is provided of any suitable type. As shown, it comprises the usual combined metallic thermostatic bar 33, secured at one end to a post 34, and having its free end arranged to move under the influence of temperature changes into contact with contact screws 35 and 36, which are adjustable in the respective posts 37 and 38.

At 39 and 40 are shown solenoids, whose plungers 41 and 42 are connected by links 43 and 44 to the respective arms of a rockmovable support located in the recess, a compressor and means for driving it, a condenser mounted on the support, and detachable connections between the compressor, condenser and the coil.

7. In a refrigerating system, in combination with a refrigerator body having a cooling chamber and a refrigerating coil in the chamber, a support located below the cooling chamber and mounted so that it can be withdrawn frontwise of the refrigerator body, a compressor and a condenser mounted on the support, detachable connections between the compressor and condenser and the coil, and means for driving the compressor.

8. In a refrigerator system, in combination with a refrigerator body having a cooling chamber with a refrigerating coil in the chamber, a movable support located below the chamber and forming with the bottom of the refrigerator body a holding recess open at the ends, a compressor and condenser mounted on the support and detachable means between the compressor and the condenser and the coil, and means for driving the compressor.

In testimony whereof, I have hereunto set my hand in the presence of two subscribing witnesses.

GUSTAV A. KRAMER.

Witnesses:
A. WHITE,
P. N. TILDEN.

J. A. KIMBER.
GOLD PANNER.
APPLICATION FILED JAN. 23, 1917.
1,280,766.
Patented Oct. 8, 1918.
3 SHEETS—SHEET 1.
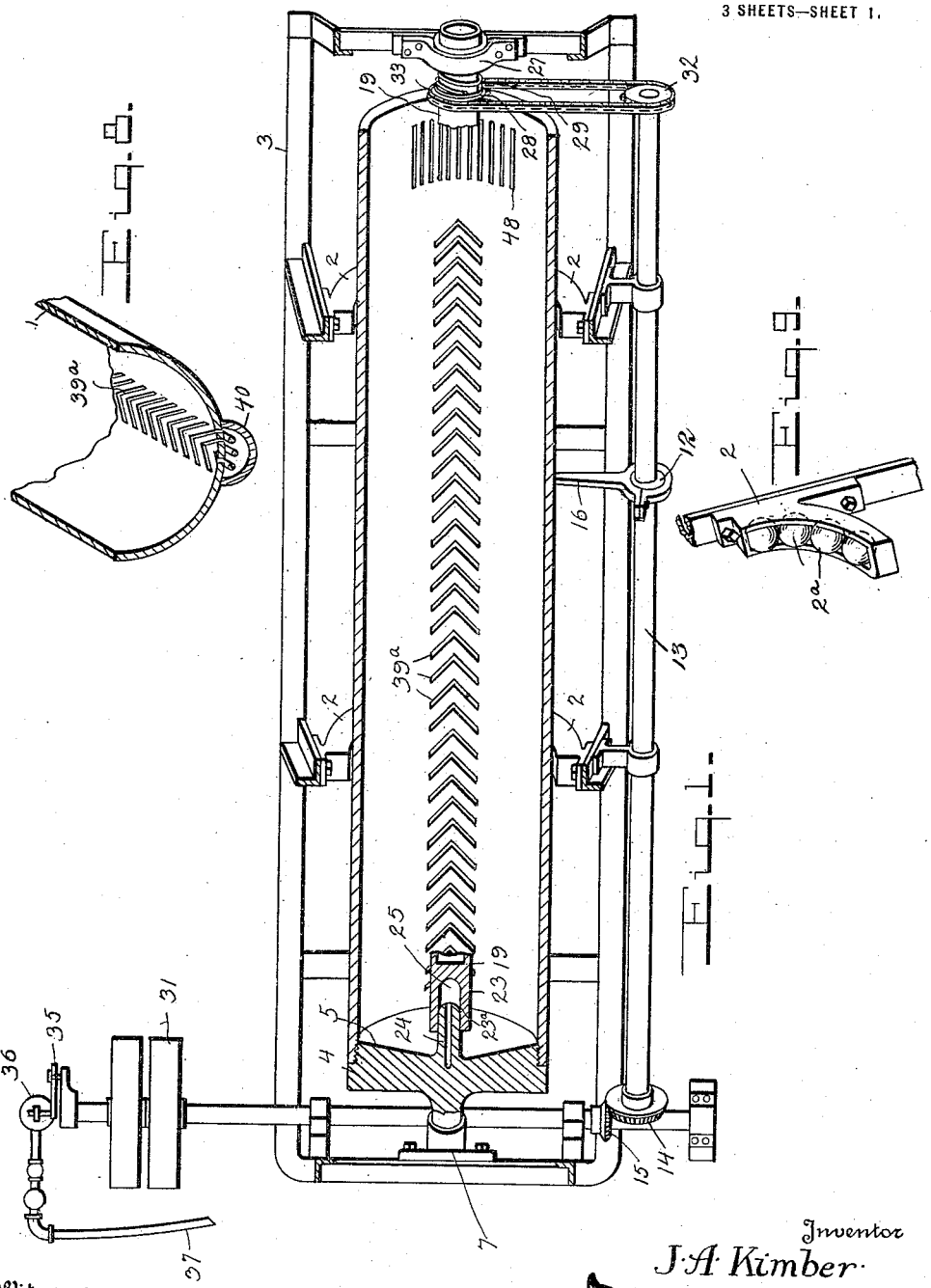
Witnesses
Inventor
J. A. Kimber
By
Attorney